United States Patent [19]
Vaswani et al.

[11] Patent Number: 6,130,674
[45] Date of Patent: Oct. 10, 2000

[54] DYNAMICALLY SELECTABLE TEXTURE FILTER FOR COMPUTER GRAPHICS

[75] Inventors: Gautam P. Vaswani, Austin; Daniel P. Wilde, Cedar park; Thomas Anthony Dye, Austin, all of Tex.

[73] Assignee: Cirrus Logic, Inc., Fremont, Calif.

[21] Appl. No.: 08/831,283

[22] Filed: Mar. 31, 1997

[51] Int. Cl.[7] .............................................. G06T 11/40
[52] U.S. Cl. .......................................................... 345/430
[58] Field of Search .................................. 345/419, 430, 345/431, 425, 428, 429

[56] References Cited

U.S. PATENT DOCUMENTS

| | | | |
|---|---|---|---|
| 4,583,185 | 4/1986 | Heartz | 364/521 |
| 4,586,038 | 4/1986 | Sims et al. | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,868,771 | 9/1989 | Lee et al. | 364/578 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 4,974,176 | 11/1990 | Buchner et al. | 364/522 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,544,292 | 8/1996 | Winser | 345/430 |
| 5,706,481 | 1/1998 | Hannah et al. | 345/430 |
| 5,740,344 | 4/1998 | Lin et al. | 345/430 |
| 5,831,624 | 11/1998 | Tarolli et al. | 345/430 |
| 5,872,902 | 2/1999 | Kuchkuda et al. | 345/430 |

FOREIGN PATENT DOCUMENTS 9636011  11/1996  WIPO .

OTHER PUBLICATIONS

Steve Forman, 3–D graphics look for better memories, Jul. 22, 1996 n911 p57(1), Journal: Electronic Engineering Times.

Barbara Robertson, Texture tactics, Jun., 1996 v19 n6 p33(4), Journal: Computer Graphics World.

Viren Shah, Consumers driving 3–D PC graphics, May 13, 1996 n901 p116(2), Journal: Electronic Engineering Times.

Billy Garrett, DRAM density helps define 3–D, May 13, 1996 n901 p118(2), Journal: Electronic Engineering Times.

(List continued on next page.)

*Primary Examiner*—Mark Zimmerman
*Assistant Examiner*—Kimbinh T. Nguyen
*Attorney, Agent, or Firm*—J. P. Violette; Peter Rutkowski; Robert P. Bell

[57] ABSTRACT

A graphics system including a selectable mode filter for improved texture mapping. An x, y pixel coordinate is mapped into a u, v texture map. The mapped u, v coordinate includes integer and fractional portions. Depending on the location of the coordinate relative to the four nearest texels, which are represented as integers, one of several texture mapping schemes are used to either select or calculate the texel value to be used to render the pixel at the x, y screen location. The three texture mapping schemes include point sampling in which the nearest texel from the texture map is selected, two-texel averaging in which the closest two texels are combined in a weighted average, and four-texel averaging in which the closest four texels are combined in a weighted average. By providing a selectable filter than can perform point sampling or two or four-texel averaging, the speed benefit of point sampling can be approached as well as the superior quality of two and four-texel averaging.

10 Claims, 9 Drawing Sheets

OTHER PUBLICATIONS

Andrew MacLellan, Microsoft issues 3–D beta but no fun for Christmas, Apr. 8, 1996 v42 n2111 p1(2), Journal: Electronic News.

Alfred Poor, When good CD–ROM drives go bad, Feb., 1996 v16 n2 p214(1), Journal: Computer Shopper.

Yong Yao, PC graphics reach new level: 3D, Jan. 22, 1996 v10 nl p14(6), Journal: Microprocessor Report.

Junko Yoshida, Cirrus taps 3DO for 3–D graphics–chip help, Apr. 1, 1996 n895 p14(1), Journal: Electronic Engineering Times.

Junko Yoshida, Miscosoft sets 3–D PC–graphics spec., Jun. 10, 1996 n905 p1(2), Journal: Electronic Engineering Times.

Jeff Bliss, Digital does Hollywood: vendor user NT to ovetake Silicon Graphics' products, Sep. 2, 1996 n699 p123(1), Journal: Computer Reseller News.

Stan Runyon, Digital–storage–oscilloscope focus shifts from raw power to productivity, Jun. 10, 1996 n905 pP1(3), Journal: Electronic Engineering Times.

Andrew MacLellan, Apple, Microsoft introduce 3–D APIs, Mar. 4, 1996 v42 n2106 p43(1), Journal: Electronic News.

Carol Levin, A new spin on 3–D graphics: Talisman aims to supercharge computer graphics, Oct. 8, 1996 v15 n17 p40(1), Journal: PC Magazine.

Barbara Robertson, Cyber acting, Apr., 1996 v19 n4 pS2(6), Journal: Computer Graphics World.

Jon Hill, A trio of new 2–D graphics cards push the envelope, but 3–D is on its way, Sep. 24, 1996 v15 n16 p66(1), Journal: PC Magazine.

Carol Venezia, Pentium Pro PCs: power to the people, Sep. 24, 1996 v15 n16 p146(17), Journal: PC Magazine.

Andrew MacLellan, PC 3D graphics market taking shape, Sep. 2, 1996 v42 n2132 p18(1), Journal: Electronic News.

Joseph Moran, ATI rages on without a 3D API, Sep., 1996 v4 n9 p144(1), Journal: Windows Sources.

Cade Metz, Protable property, Aug., 1996 v15 n14 p100(28), Journal: PC Magazine.

Jan Ozer, 3–D comes alive, Jun. 25, 1996 v15 n12 p172(5); Journal: PC Magazine.

Yong Yao, AGP speeds 3D graphics, Jun. 17, 1996 v10 n8 p11(5), Journal: Microprocessor Report.

Stephen W. Plain, Entering the third dimension, Jun., 1996 v16 n6 p570(4), Journal: Computer Shopper.

Brad Grimes, Speeding down Highway 95, Jun. 1996 v14 n6 p220(8), Journal; PC World.

Linley Gwennap, Verite: a programmable 3D chip, May 6, 1996 v10 n6 p1(6), Journal: Microprocessor Report.

Author unknown, S–MOS 3D chip leverages frame buffer, May 6, 1996 v10 n6 p5(2), Journal: Microprocessor Report.

Matthew Donham, Visual instructions can paint images, Apr. 1, 1996 n895 p53(2), Journal: Electronic Engineering Times.

Donna Coco, 3D chip powers arcade game, Apr., 1996 v19 n4 p17(2), Journal: Computer Graphics World.

Yong Yao, Competition heats up in 3D accelerators: market hngers for a unified multimedia platform from Micrsoft, Mar. 5, 1996 v10 n3 p16(8), Journal: Microprocessor Report.

Jon Hill, For your eyes only: graphics accelerators blaze new trails with 3–D and video, Mar., 1996 v16 n3 p290(12), Journal: Computer Shopper.

Daniel, Grotta; Sally Wiener Grotta, Super Coolscan: rugged film scanner for images on the go, Jan. 9, 1996 v15 n1 p51(1), Journal: PC Magazine.

Bernard Cole, A new paradigm defines PCs, Dec. 15, 1995 n880 p10(3), Journal: Electronic Engineering Times.

Author unknown, Sigma Lanches MPEG–1 for Video CD, Jun. 17, 1996 v10 n8 p5(1), Journal: Microprocessor Report.

DYNAMICALLY SELECTABLE TEXTURE FILTER FOR COMPUTER GRAPHICS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

A. Field of the Invention

The present invention relates generally to a graphics system for a personal computer. More particularly, the present invention relates to a system for providing texture to images on a computer screen. Still more particularly, the present invention relates to an improved texturing technique that uses a selectable mode texture filter for applying a texture map to pixels on a screen.

B. Background of the Invention

Before the availability of the personal computer (commonly referred to as a PC), computer graphics packages were expensive tools primarily reserved for industrial applications. Early microcomputers were only capable of rendering simple line drawings with a low screen resolution (256 pixels×256 pixels, for example). As microcomputers evolved, higher resolution color displays became available, and software applications routinely provided data output in a graphical format. The graphics techniques used were unstructured, with objects defined in terms of absolute coordinates using straight lines. Subsequently, graphics "primitives" were developed, enabling circles, ellipses, rectangles and polygons to be drawn with single software instructions. The use of primitives for drawing shapes increased the speed at which the images could be rendered.

The availability of computer graphics has generated a demand for higher resolutions and three dimensional (3-D) rendering capabilities. Computer animation and games, in particular, have spawned a revolution in computer graphics capabilities. A 3-D image can be represented in a computer system as a collection of graphical objects, such as polygons, lines, and points. A set of vertex points defines a polygon. Associated with each point are certain parameters, such as shading, texturing, color, and the like. Identification of other non-vertex points within the polygon typically is done through the use of linear interpolation. Once interpolated, the polygon can be rendered on a computer monitor by scanning of successive rows of the polygon. By drawing multiple polygons on the screen at a time, an object can be drawn.

Further advancements in the computer graphics arena have led to techniques for enhancing the realistic appearance of objects drawn on the screen. Texture mapping, one of the significant aspects of 3-D graphics permits images on a computer screen to be displayed with texture. Thus, for example, a table top can be textured to have the appearance of a wood-grain or marble surface, or any other desired surface. In computer graphics, a texture map is an array of pixels that represents a particular pattern, such as a single brick. By repeatedly applying the texture map of a brick to side of a building, for example, the side will appear as a brick wall. The amount of memory required to represent the brick wall is minimal because only enough memory is required to store a texture map for a single brick. A pixel in a texture map is called a "texel." A texture map typically is constructed from a two-dimensional array of texels (typically represented with digital values). A u, v address or coordinate associated with each texel value in the texture map. Pixels on the computer screen, however, are assigned x, y addresses to represent the spatial location of the pixel on the computer screen. Thus, a pixel with an address of (10, 14) would be in the tenth column of pixels, fourteen rows down on the computer screen. Because texel values are not assigned an x, y value when applying a texture map to a polygon on the screen, a conversion from an x, y pixel address to a u, v texture map address is necessary. The conversion process is termed "mapping." A texel mapping algorithm thus uses an x, y pixel address to look up a corresponding texel in a texture map. The texel is then used to render the pixel at the x, y screen address.

Ordinarily, an x, y pixel address converts to a fractional u, v texture map coordinate. A "10.16" format is typically used to represent the converted u and v coordinates in which 10 bits are used for the integer portion of the coordinate along with 16 fractional bits. The coordinates of texel values in a texel map, however, include only integer values, and thus the converted u, v coordinate usually will not correspond exactly to a texel in the texel map. Point sampling provides the simplest method for selecting a texel from a texel map for applying to objects. In point sampling, the texel from the texture map closest to the fractional u, v coordinate is selected to render the corresponding x, y pixel on the screen. For example and referring to FIG. 1, four texels A, B, C, and D from a texture map are shown with their integer u, v coordinates. An address in x, y space might convert to u, v texture space as point P1 with u, v coordinates (1.25, 1.30). Of the four closest texels A, B, C, and D, point P1 is closest texel A. Using the point sampling technique, texel A would be selected to be mapped onto the x, y pixel associated with point P1. With point sampling, only one texel is used for each pixel during mapping and thus only one memory access is required to fetch the selected nearest texel. Although simple and fast, images rendered with point sampling may appear blocky and "scintillate," or sparkle, when the object moves detracting from the appearance of the object.

In certain instances, however, point sampled images are acceptable. For example, rendered with perspective, a brick wall may appear to recede into the distance. The appearance of the foreground part of the wall would suffer if point sampling was used. However, the problems associated with point sampled images would be imperceptible if point sampling was used to texture the distant part of the wall because of the diminished resolution associated with objects drawn to appear distant.

Filtering techniques such as bilinear averaging result generally in higher quality texture images. Bilinear averaging combines the four nearest texels in a weighted average to derive a single texel value used to render the pixel. Referring again to FIG. 1, in the u axis point P1 is generally closer to texel A than texel B and closer to texel C than texel D. Thus, the bilinear weighted average of texels A, B, C, and D generally weights A more than B, and C more than D. In the v axis, the result is similar with texels A and B weighted more heavily than texels C and D because point P1 is closer to texels A and B than C and D. Bilinear averaged images achieve superior quality than point sampled images, but require more computer and processing power. Because four texels are averaged together, four accesses to texture memory are required to fetch the four texels, taking considerably more time than the single memory access required by point sampling. Further, the averaging process, including calculation of the weights associated with each texel to be averaged, requires time to perform.

Graphics systems that employ texturing typically use only one texture mapping technique at a time when rendering images. Thus, one graphics system might use point sampling for faster speed, while other systems might use bilinear averaging for higher quality. Both types of systems, however, suffer from the problems attendant to each texturing technique.

There is a need for an improved graphics system that provides the high quality texture mapped images of bilinear averaging and other filtering methods, at speeds comparable to point sampling techniques. Such a system would permit high quality graphics at speeds faster than permitted by standard filtering techniques. Despite the advantages such a system would offer, to date no such system has been developed.

BRIEF SUMMARY OF THE INVENTION

A method and apparatus is disclosed which includes a selectable mode filter for improved texture mapping. As part of the texturing process, and in accordance with prior techniques an x, y pixel address is converted to a u, v coordinate in a texture map. The converted u, v coordinate includes integer and fractional portions. The texture map includes texels with only integer coordinates. Depending on the location of the u, v coordinate relative to the four closest texels, the present invention selects one of three texture mapping schemes to select a texel value from the texel map to use in rendering the pixel at the x, y pixel address. The three texture mapping schemes used to select the texel value preferably include point sampling (in which the nearest texel from the texture map is selected), two-texel averaging (in which the closest two texels are combined in a weighted average), and four-texel averaging (in which the closest four texels are combined in a weighted average).

In accordance with the present invention, the graphics system selects the texture mapping scheme to implement based upon some predetermined criteria. Thus, the point sampling scheme preferably is implemented when the u, v coordinate is within a predetermined distance from a texel. If the point sampling scheme is implemented, the closest texel is selected and used to render the x, y pixel. Point sampling generally is faster than other texture mapping techniques, but provides graphics images whose quality is inferior to other techniques. By only implementing point sampling when the converted u, v coordinate is relatively close to a texel value in the texel map, graphics distortion is kept at a minimum, while the system speed is maximized.

If, however, the converted u, v coordinate is located within a predetermined distance from two texels, but greater than a certain distance from all other texels, then the two closest texels are combined in a weighted average. The two-texel average weights the closest texel proportionately more heavily than the other texel. The weights calculated for each texel in the two-texel average is a function of the proximity of each texel to the converted u, v coordinate. Two-texel averaging generally is slower than point sampling because two texels must be fetched from memory, weights for each texel must be calculated, and the texels then must be combined in a weighted average. The quality of two-texel filtered images, however, is generally superior to images produced by point sampling. In addition, the graphics processing of a two-texel filtering scheme is faster than a four-texel averaging scheme.

If the mapped u, v coordinate is sufficiently distant from all four of the four closest texels, the four closest texels are combined in a weighted average based upon the proximity of each texel to the converted u, v coordinate values. Consequently, texels closer to the u, v location are weighted more heavily than the texels located farther away from the converted coordinates. Four-texel averaging generally provides superior computer graphics, but requires the time-consuming retrieval of four texels from memory, as well as the calculation of a weight for each texel and the weighted combination of the four texels.

By providing a selectable filter that performs point sampling, as well as two or four-texel averaging, the graphics system can achieve the speeds approaching those of systems that use only point sampling, while at the same time obtaining superior quality texturing. Moreover, the areas in the texture map in which each of the three texture mapping techniques is used is adjustable permitting increased system flexibility to fine tune the texture mapping process. Thus, a programmer can use the fast point sampling when quality and accuracy of an individual texel is of less concern, while using a higher quality scheme in other instances.

BRIEF DESCRIPTION OF THE DRAWINGS

For a detailed description of the preferred embodiments of the invention, reference will now be made to the accompanying drawings wherein.

DETAILED DESCRIPTION OF THE INVENTION

Figure 2:
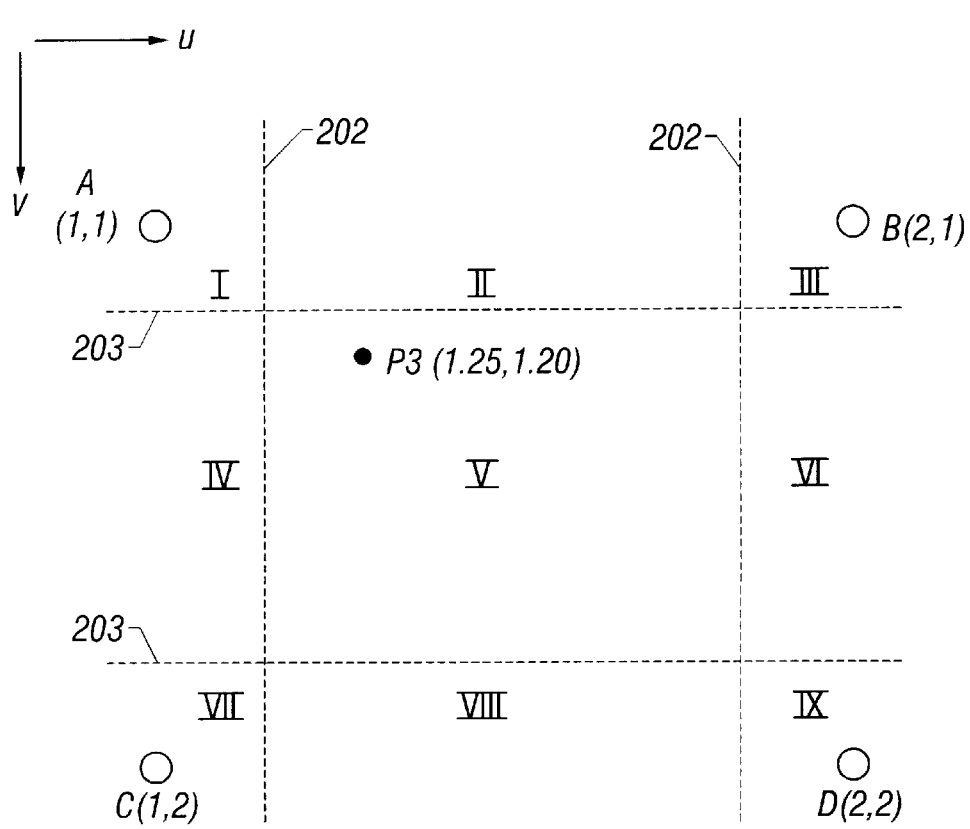
FIG. 2 is a portion of a texture map divided into nine regions for texture mapping in accordance with the present invention.

Referring now to FIG. 2, a group of four texels A, B, C, D from an exemplary texture map is shown divided into nine regions labeled I, II, III, IV, V, VI, VII, VIII, and IX, respectively. The nine regions are separated by dashed lines 202, 203. Each texel has an integer u, v address or coordinate. As shown, the u axis runs horizontally and the v axis runs vertically in accordance with normal convention. Texel A has a u, v address of (1,1), while the address of texel B is (2,1), and the addresses of texels C and D are (1, 2) and (2, 2), respectively. As discussed in the Background of the Invention, the conversion of an x, y address to a u, v coordinate typically results in a u, v coordinate with a fractional value. The selectable mode filtering technique of the present invention dynamically selects an appropriate texturing technique for each pixel. The selection of the texturing technique depends on the location of the converted u, v coordinate within the nine regions.

Texture mapping techniques, such as point sampling and bilinear averaging for example, have advantages and disadvantages. Point sampling is generally faster than bilinear averaging, but bilinear averaging generally produces higher quality images than images produced using point sampling. Current graphics systems typically only use one texture mapping technique. Thus, one system might use only point sampling to texture map an object on the screen, while another system might use bilinear averaging. The advantages current graphics systems enjoy, as well as the disadvantages such systems suffer, depend to a large extent on the particular texture mapping technique used. Generally, graphics systems designers tradeoff speed against quality; higher speed is achieved with point sampling and higher image quality is achieved with bilinear averaging.

Figure 1:
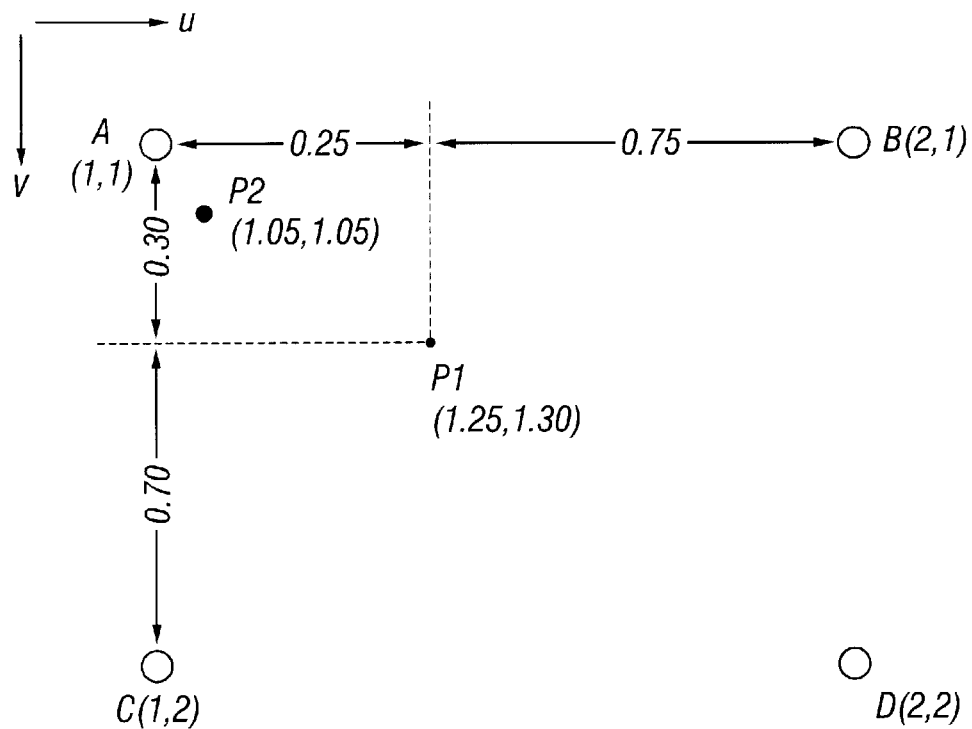
FIG. 1 shows an exemplary portion of a texture map including two points with fractional u, v coordinates.

The present invention takes advantage of the benefits of three texture mapping techniques and uses each technique only in those situations in which the speed versus quality tradeoff favors each techniques. Moreover, one skilled in the art will understand that other mapping techniques may be included as part of the selection process, with selection of a particular scheme to implement based upon certain criteria. The determination as to which texturing technique to use is made dynamically for each texel while the image is being drawn on the screen. Thus, one texel value for rendering a pixel may be produced using one texturing technique, while the next texel is produced using a different technique, and so on. Thus, in those situations when the benefit of point sampling (greater speed) outweighs its disadvantage (lower quality images), point sampling is used as the texture mapping technique by the present invention. Conversely, in those instances that favor filtering, the two or four nearest texels are linearly averaged together. For example, referring to FIG. 1, the u, v coordinate of point P2 (1.05, 1.05) is very close to texel A. Graphics systems that use bilinear averaging will combine texels A, B, C, and D to generate a texel for point P2. Because of the substantial proximity of point P1 to texel A, however, the value of texel A dominates the averaging equation and heavily influences the texel value of point P1. In fact, the texel value computed for point P1 may be almost identical to the value of texel A. In that case bilinear averaging provides little benefit because the weights given to texels B, C, and D are minimal compared to the weight given texel A. The same result is true for any u, v point substantially close to a texel. Thus, for this situation, the speed advantage of point sampling outweighs the quality advantage of bilinear averaging.

Referring again to FIG. 2, regions I, III, VII, and IX represent those regions in which point sampling preferably is used by the present invention. For u, v coordinates falling within these regions, the speed advantage of point sampling generally outweighs the quality benefit of bilinear averaging, or any other filtering technique. Bilinear filtering (or four-texel averaging) is employed for u, v coordinates falling within region v because points in region v are sufficiently distant from texels A, B, C, and D that the quality benefit of bilinear filtering becomes crucial, outweighing the greater speed of point sampling.

For u, v points falling within regions II, IV, VI, and VIII, a different filtering method is used in which the nearest two texels are averaged together with appropriate scale factors. Points in region II are sufficiently distant from texels C and D that if bilinear averaging were used, the relative contributions to the computed texel value would be dominated by contributions from texels A and B, with little contribution from texels C and D. In computing texel values for points in region II, texels C and D are ignored and only texels A and B are used in a two-texel scaled averaging technique. Scale factors are calculated for each texel A and B. The scale factors are a function of the proximity of the u, v coordinate to each texel. Thus, closer texels are weighted more heavily than more distant texels. Similarly, for region IV, texels A and C are averaged. For region VI, texels B and D are averaged and for region VIII, texels C and D are averaged.

Figure 3:
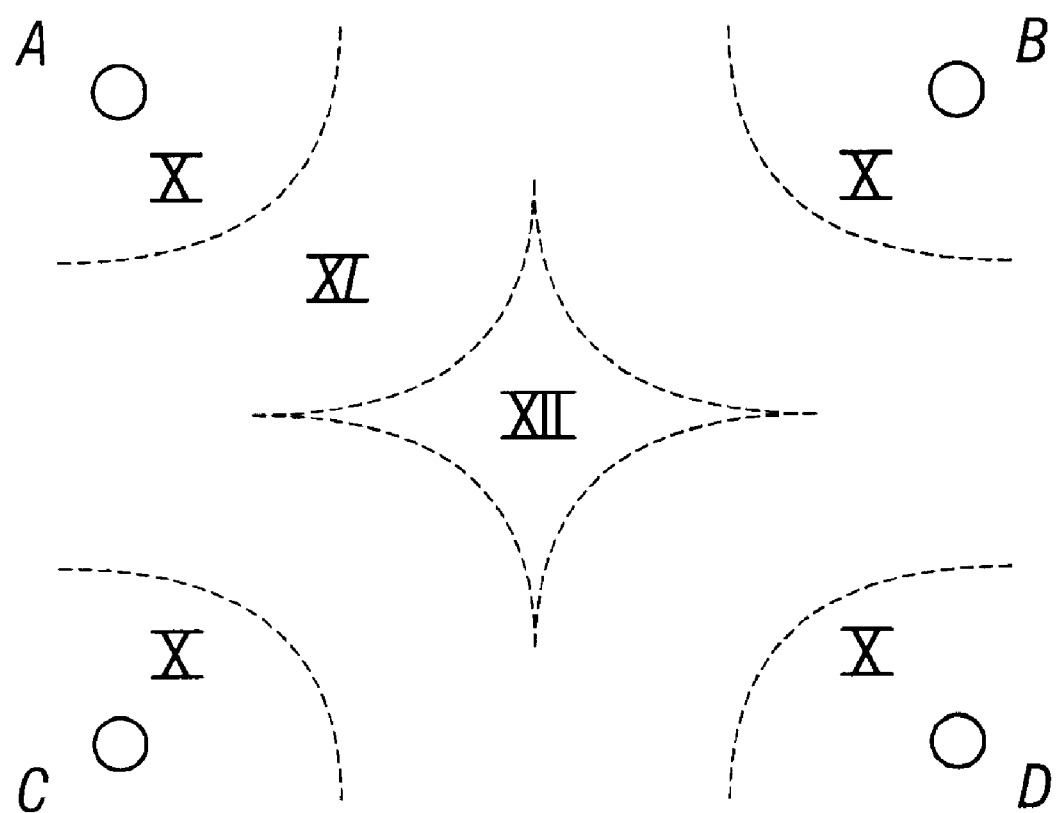
FIG. 3 shows an alternative texture map to that of FIG. 2.

By permitting the location of the boundary defining lines 202, 203 to be programmable, the present invention also advantageously allows for control over the sizes of the nine regions I–IX. Moreover, by controlling the sizes of the nine regions, the present invention provides flexibility in determining when to use each of the three texturing mapping techniques. Further, while a rectangular boundary region has been defined, it should be understood that other boundary schemes may be used without departing from the principles of the present invention, as shown for example in FIG. 3. In FIG. 3 point sampling may be used for u, v coordinates in regions X, two texel averaging in region XI, and four-texel averaging in region XII. For purposes of the following description, the preferred scheme of FIG. 2 will be described with the understanding that other schemes are available and could be implemented without departing from the principles of this invention.

Figure 4:
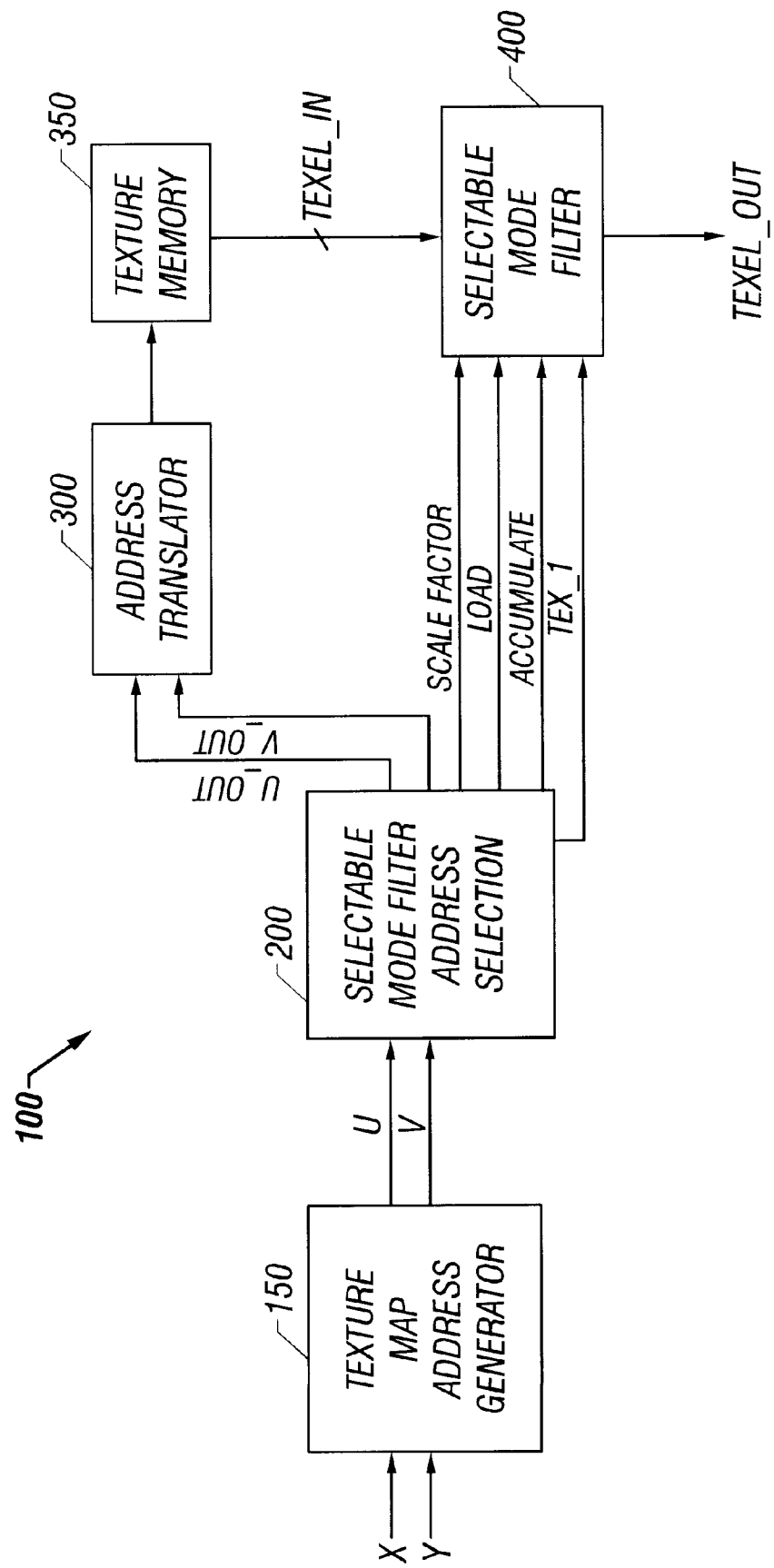
FIG. 4 shows a block diagram of the present invention including selectable mode filter address selection and a selectable mode filter.

Referring now to FIG. 4, a graphics system 100 constructed in accordance with a preferred embodiment includes texture map address generator 150, selectable mode filter address selection 200, address translator 300, texture memory 350, and selectable mode filter 400. Broadly, an x, y pixel address is provided as an input to texture map address generator 150 which converts the x, y pixel address to a fractional u, v texel coordinate (i.e., a coordinate with integer and fractional portions). Graphics system 100 uses the u, v coordinate to access texel values from texture memory 350. Selectable mode filter 400 linearly combines the texel values (texel_in) from texture memory to compute a single texel output value (texel_out) which then is used to render the pixel associated with the x, y address. The texel_in values are linearly combined for purposes of the following description, the preferred scheme of FIG. 2 will be described, with the understanding that other schemes are available and could be implemented without departing from the principles of this invention by selectable mode filter 400 according to scale factors provided by selectable mode filter address selection 200. Load and accumulate signals are also provided by selectable mode filter address selection 200 to selectable mode filter 400 to control operation of filter 400, as will be explained in detail below.

Texture map address generator 150, address translation 300, and texture memory 350 are components known to those of ordinary skill in the art. Texture map address generator 150 preferably converts an x, y pixel address to a u, v coordinate with a 10.16 format. The u, v coordinate with a 10.16 format, as described previously, includes 10 integer bit and 16 fractional bit values. As will be explained below, selectable mode filter address selection 200 produces an integer u, v texel address, (u_out, v_out,) according to the selectable mode texturing techniques of the present invention. Address translation unit 300 translates the (u_out, v_out) texel address into a texture memory address.

Texture maps preferably are stored in texture memory 350. Texture memory 350 may include any common memory device and preferably a type of includes a type of random access memory (RAM) operating as system memory. The texture map address provided by address translation 300 to texture memory 350, therefore, preferably comprises physical memory address space. Address translation 300 may be integrated in the memory controller unit (not specifically shown) of the computer if desired.

Figure 5:
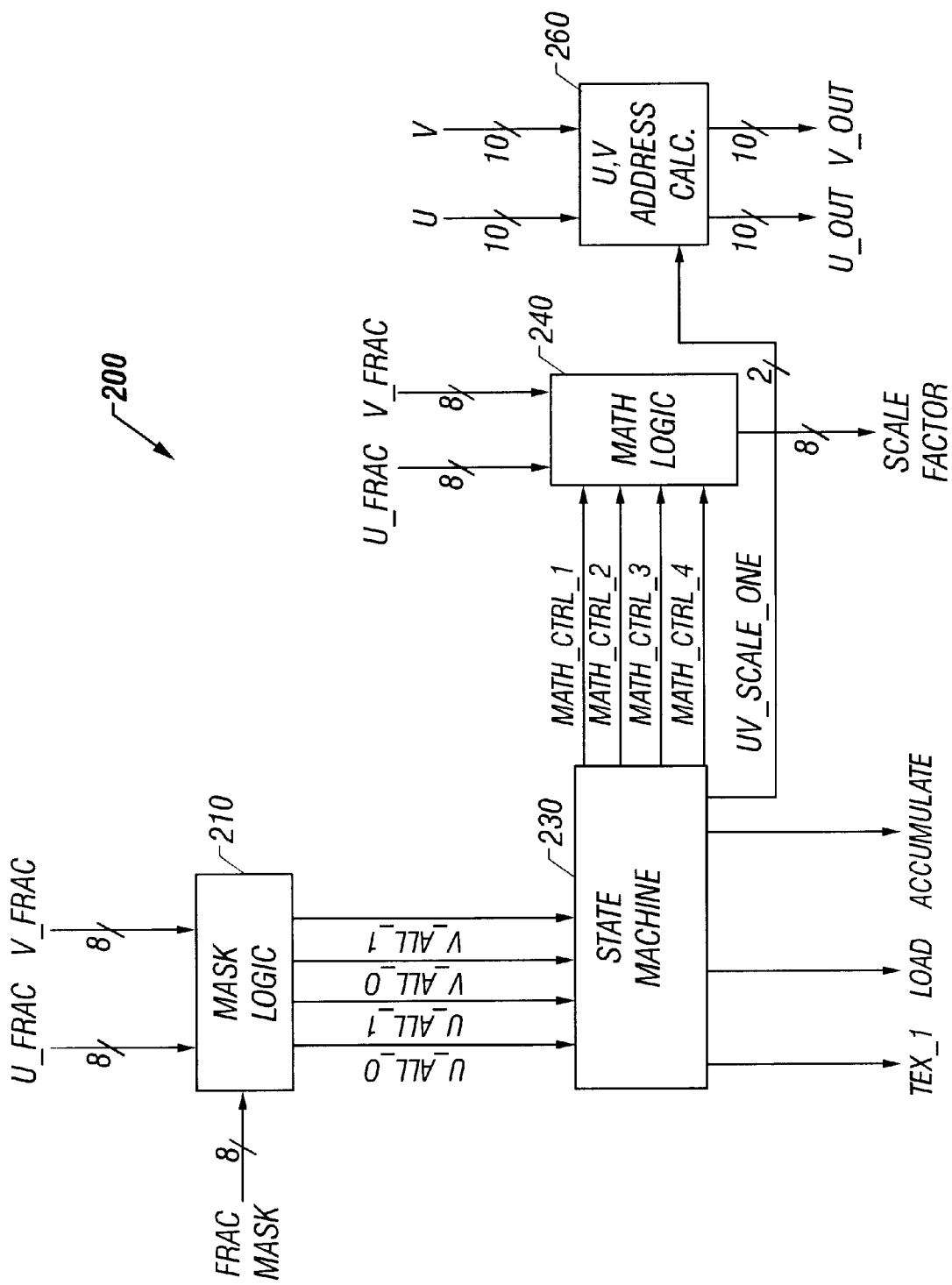
FIG. 5 shows a more detailed block diagram of the selectable mode filter address selection of FIG. 3 including mask logic, a state machine, math logic, and u, v address calculation.

Referring now to FIG. 5, selectable filter address selection 200 generally includes mask logic 210, state machine 230, math logic 240, and u, v address calculation 260. Mask logic 210 receives the fractional portion of the u, v address as input signals (u_frac and v_frac). In the 10.16 format, 16 fractional bits (bits 0–15) are used to represent each u and v coordinate. To simplify the circuitry, however, only a subset of the 16 fractional bits are used in the preferred embodiment of the present invention. Preferably the eight most significant fractional bits (bits 8–15) of each u coordinate and v coordinate are used as the u_frac and v_frac signals. A frac mask signal is also provided as an input to mask logic 210. The frac mask signal preferably is stored in memory in the computer and provided to mask logic 210 by known techniques. The frac mask signal preferably is an eight bit value that determines the location of the dashed lines 202, 203 (FIG. 2) relative to the texels, as will become apparent below.

Mask logic 210 uses the u_frac and v_frac signals to determine in which of the nine regions (FIG. 2) the associated u, v coordinate lies. A explained in detail below with reference to FIG. 6, mask logic 210 applies the frac mask signal to the u_frac and v_frac signals to produce four output signals (u_all_0, u_all_1, v_all_0, and v_all_1), which are provided to state machine 230. The state of these four signals signifies in which of the nine regions the u, v coordinate lies.

Based on the state of the four output signals (u_all_0, u_all_1, v_all_0, and v_all_1), state machine 230 produces three control signals (tex_1, load, and accumulate) that specify the filtering scheme to implement. As shown in FIG. 4, the control signals (tex_1, load and accumulate) are provided to selectable mode filter 400, which, based upon the control signals, either computes a two or four texel averaged value or selects the nearest texel for point sampling. Referring again to FIG. 5, state machine 230 also produces four control signals for directing the operation of math logic 240. A fifth control signal (uv_plus_one) is transmitted to u, v address calculation 260 which determines the u_out and v_out signals based upon that control signal.

After determining in which region the u, v coordinate lies, state machine 230 preferably directs the present invention to provide a single texel value if point sampling is appropriate (regions I, III, VII, and IX), two texels if two texel averaging is appropriate (regions II, IV, VI, and VIII), or four texels if bilinear averaging is appropriate (region V). The state machine is clocked through predetermined appropriate states to produce the necessary texels for texture mapping in accordance with the present invention. State machine 230 is described in greater detail below with respect to FIGS. 8 and 9.

Math logic 240 uses the u_frac and v_frac signals along with the math_ctrl signals (math_ctrl_1–math_ctrl_4) provided by state machine 230 and performs the mathematical calculations to determine the appropriate scale factors or weights associated with two-texel or four-texel averaging. Point sampling requires no scaling and thus no weight is calculated during point sampling. The calculated weights are provided as a series of output scale factors from math logic 240. If the two-texel averaging scheme is implemented two texels are combined as a scaled average. Math logic 240 thus computes one scale factor for each texel to be averaged. Similarly, in bilinear or four texel averaging, four texels are combined in a weighted average, and math logic 240 computes a unique scale factor for each of the four texels to be averaged. Based on the state of the u_all_0, u_all_1, v_all_0, and v_all_1 control signals, state machine 230 determines whether two or four texel averaging is to be performed and directs math logic 240 accordingly. In response, math logic 240 provides a series of output scale factors.

The u, v address calculation 260 determines the coordinate of each texel to be averaged during two or four texel averaging. For two-texel averaging, u, v address calculation 260 generates two u_out, v_out texel coordinates corresponding to the two texels to be averaged. During four-texel averaging mode, u, v address calc generates four u_out, v_out texel coordinates. The 10 bit integer portion of the u, v texel coordinate generated by texture map address generator 150 (FIG. 4) is provided as an input signal to u, v address calculation 260. As one skilled in the art will understand, the 10 bit integer portion of all u, v coordinates within regions I–IX of FIG. 2 correspond to the location of texel A. That is, the integer portion of any u, v, location within regions I–IX is (1, 1), the coordinate of texel A. To generate the coordinate any of the other three texels B, C, and/or D needed for texture mapping, either or both of the u and v values is incremented. Thus, to generate the coordinate of texel B (2, 1), the u input value to u, v address calculation 260 is incremented by one integer value, while the v input integer value remains 1. Similarly to generate the coordinate of texel C (1, 2), the u input integer value remains a 1, while the v input value integer is incremented by 1. Finally, to generate the coordinate for texel D (2, 2), both u and v input integer values are incremented by 1. The uv_plus_one signal from state machine 230 is used by u, v address calculation 260 to determine when a u and/or v coordinate value is to be incremented. The uv_plus_one signal preferably comprise two bits, one bit for u and the other bit for v. Further, a logic one may be used to mean increment the associated 10 bit integer coordinate and a logic zero may be used to mean do not increment the associated 10 bit coordinate. Logic for incrementing the 10 bit u and v coordinates is known by those of ordinary skill in the art and thus is not specifically shown.

The four math_ctrl signals and the uv_plus_one signal generated by state machine 230 directs u, v address calculation 260 to produce u_out, v_out texel coordinates and math logic 240 to produce scale factor values associated with each u_out, v_out coordinate. Thus, for two-texel averaging u, v address calculation 260 produces two texel coordinates and math logic 240 provides a scale factor with each coordinate (i.e., one scale factor per each u, v coordinate). Similarly, for four-texel averaging, u, v address calc 260 provides four texel coordinates and math logic 240 provides four scale factors with each coordinate. State machine 230 controls the timing of math logic 240 and u, v address calc 260 so that the scale factors are provided at substantially the same time as the u_out, v_out texel coordinates are provided.

Figure 6A:
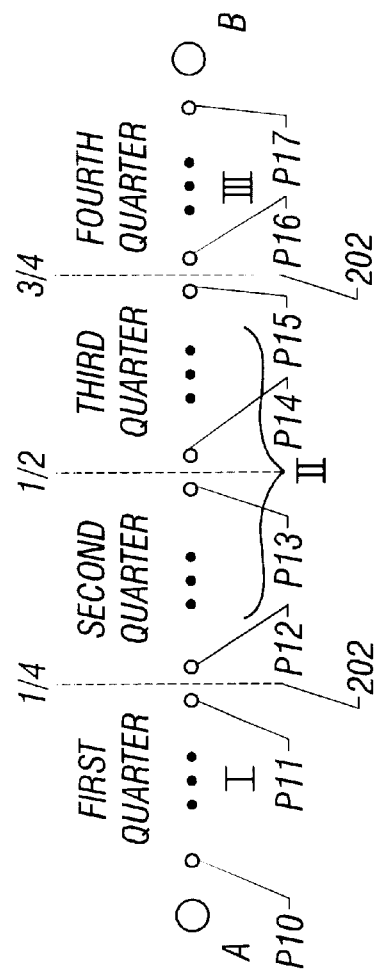
FIG. 6A shows two exemplary texels of a texture map with intervening coordinate positions divided into four portions.

Referring now to FIG. 6A, texels A and B are shown with a portion of regions I, II, and III. Although the concept of distinguishing the various regions is shown with respect to regions I, II, and III in the u axis, the same principle also applies to the v axis and regions IV–XI as well. The present invention uses the 8 most significant bits of the fractional portion of each u, v coordinate for texture mapping. Thus, there are $2^8$ or 256 8-bit u, v fractional coordinates between adjacent texels. The u, v points P10, P11, P12, P13, P14, P15, P16, and P17 represent eight of the 256 fractional coordinates between texels A and B. The fractional values of the u, v coordinates associated with points P10–P17 are shown below in Table 1.

TABLE I

| Point | 8-Bit u, v coordinate value | | | | | | | |
|---|---|---|---|---|---|---|---|---|
| | 7 | 6 | 5 | 4 | 3 | 2 | 1 | 0 |
| P10 | 0 | 0 | 0 | 0 | 0 | 0 | 0 | 0 |
| P11 | 0 | 0 | 1 | 1 | 1 | 1 | 1 | 1 |
| P12 | 0 | 1 | 0 | 0 | 0 | 0 | 0 | 0 |
| P13 | 0 | 1 | 1 | 1 | 1 | 1 | 1 | 1 |
| P14 | 1 | 0 | 0 | 0 | 0 | 0 | 0 | 0 |
| P15 | 1 | 0 | 1 | 1 | 1 | 1 | 1 | 1 |
| P16 | 1 | 1 | 0 | 0 | 0 | 0 | 0 | 0 |
| P17 | 1 | 1 | 1 | 1 | 1 | 1 | 1 | 1 |

Points P10 and P17 represent points immediately adjacent to texels A and B and points P11–P16 represent intermediate points. The 256 8-bit u, v fractional coordinates between texels A and B can be divided into four sections or quarters shown by the dashed lines labeled ¼, ½, and ¾ in FIG. 6A. Point P11 represents the last point in the first quarter, while point P12 represents the first point in the second quarter. Similarly, points P13 and P14 represent the last point in the second quarter and the first point in the third quarter, respectively. Finally, points P15 and P16 represent the last point in the third quarter and the first point in the fourth quarter. Region I includes points in the first quarter. Region 11 includes fractional coordinates in the second and third quarters, and region III includes points in the fourth quarter.

As can be seen in Table I, the two most significant bits (bits 6 and 7) of the 8-bit fractional coordinate to the left of the dashed line determine in which quarter, and thus in which region, the point lies. Points P10 and P11 both lie in the first quarter and both have "00" values for the two most significant bits. Points P12 and P13 are in the second quarter and both have values of "01" for bits 6 and 7, while points P14 and P15 have "10" for bit positions 6 and 7. Finally, points P16 and P17 are in the fourth quarter and both have "11" for bits 6 and 7. Because the boundary lines 202 separating regions I, II, and III align with the boundaries between the first and second quarters and the third and fourth quarters, whether a fractional coordinate value is included in regions I, II, or III is determined simply by inspection of the upper two most significant bits of the fractional values u_frac and v_frac. Coordinate values in region I have all 0 values as bits 6 and 7, while coordinate values in region III have all 1 values as bits 6 and 7. Coordinate values in region II are distinguishable because they have at least one 0 value and at least one 1 value in bit positions 6 and 7 (either "01" or "10").

Figure 6B:
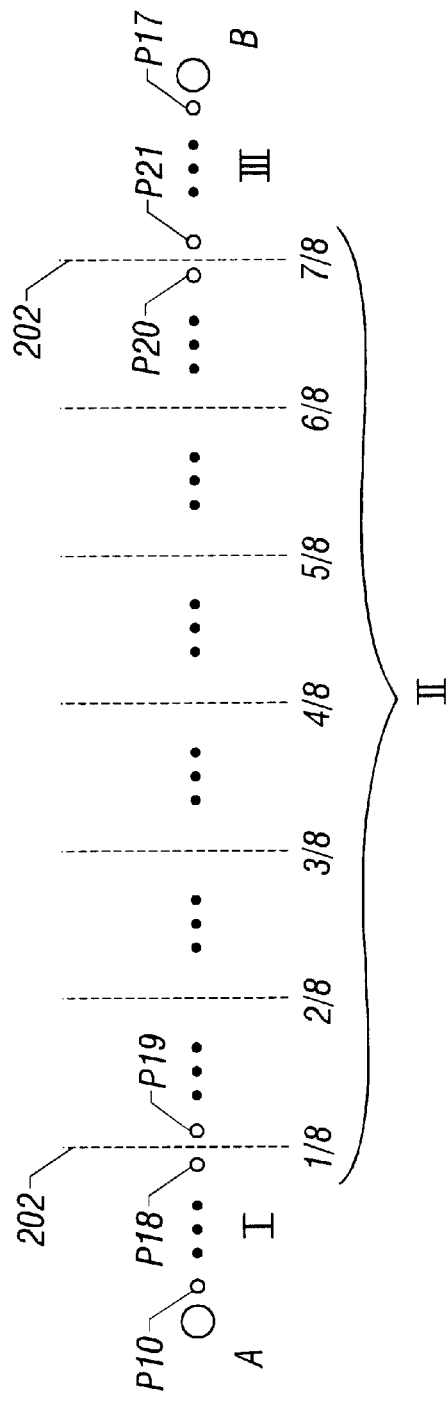
FIG. 6B shows two exemplary texels of a texture map with intervening coordinate positions divided into eight portions.

By way of a further example, with reference to FIG. 6B the 256 8-bit fractional coordinates between texels A and B can be divided into eight equal areas separated by dashed lines labeled ⅛, ⅖, ⅜, ⅘, ⅝, ⅚, and ⅞. The boundary lines 202 of regions I, II, and III can be aligned with the ⅛ and ⅞ demarcations as shown in FIG. 5B. To determine in which eighth portion an 8-bit coordinate lies, inspection of the upper three most significant bits (bit positions 5–7) of the u, v coordinate is necessary as shown to the left of the dashed line in Table 11 below.

TABLE II

| | 8-bit u, v coordinate | | | | | | | |
|---|---|---|---|---|---|---|---|---|
| Point | 7 | 6 | 5 | 4 | 3 | 2 | 1 | 0 |
| P10 | 0 | 0 | 0 | 0 | 0 | 0 | 0 | 0 |
| P18 | 0 | 0 | 0 | 1 | 1 | 1 | 1 | 1 |
| P19 | 0 | 0 | 1 | 0 | 0 | 0 | 0 | 0 |
| P20 | 1 | 1 | 0 | 1 | 1 | 1 | 1 | 1 |
| P21 | 1 | 1 | 1 | 0 | 0 | 0 | 0 | 0 |
| P17 | 1 | 1 | 1 | 1 | 1 | 1 | 1 | 1 |

Coordinate values in region I will have as their three most significant bits (bits 5–7) a value of "000" while coordinate values in region III will have the value of "111" in the positions 5–7. By default, coordinate values in region II can be determined because the upper three bit positions will not be all binary 0 values or all binary 1 values.

As demonstrated by the examples above, examination of the most significant bits of u_frac determines whether the associated coordinate is in regions I, IV, VII or regions II, V, VIII, or regions III, VI, IX. Thus, considering just the upper order bits in u_frac divides the u axis into three distinct areas. A similar trisection occurs with respect to the v axis by examination of the upper order bits of v_frac. The intersection of the area in the u axis including a u, v coordinate and the area in the v axis also including the coordinate results in a single region out of nine regions. This region is the region in which the u, v coordinate lies.

Referring again to FIG. 2, the number of most significant bits of u_frac and v_frac that are considered in the examination described above dictates the relative location of boundary lines 202, 203. The frac mask signal is an eight bit code that specifies which upper order bits of the u_frac and v_frac values are to be considered in determining the region associated with the coordinate. Preferably logic 0 values in the frac mask signify that the corresponding bit positions in the eight-bit fractional coordinate value is to be considered and logic 1 values signify the corresponding bits are to be ignored. For example, a frac mask signal "0011 1111" dictates that the two most significant bits in the eight bit fractional coordinate are to be considered. Similarly, a frac mask signal "0001 1111" signifies that the three most significant bits of the fractional coordinate value are to be considered. Thus, the n most significant bits (where 1≦n≦8) in the frac mask effectively determines the location of boundary lines 202, 203 in the texture map. One of ordinary skill in the art will recognize alternatively that other coding schemes might be used to signify which bits in the fractional coordinate value are to be considered.

Figure 7:
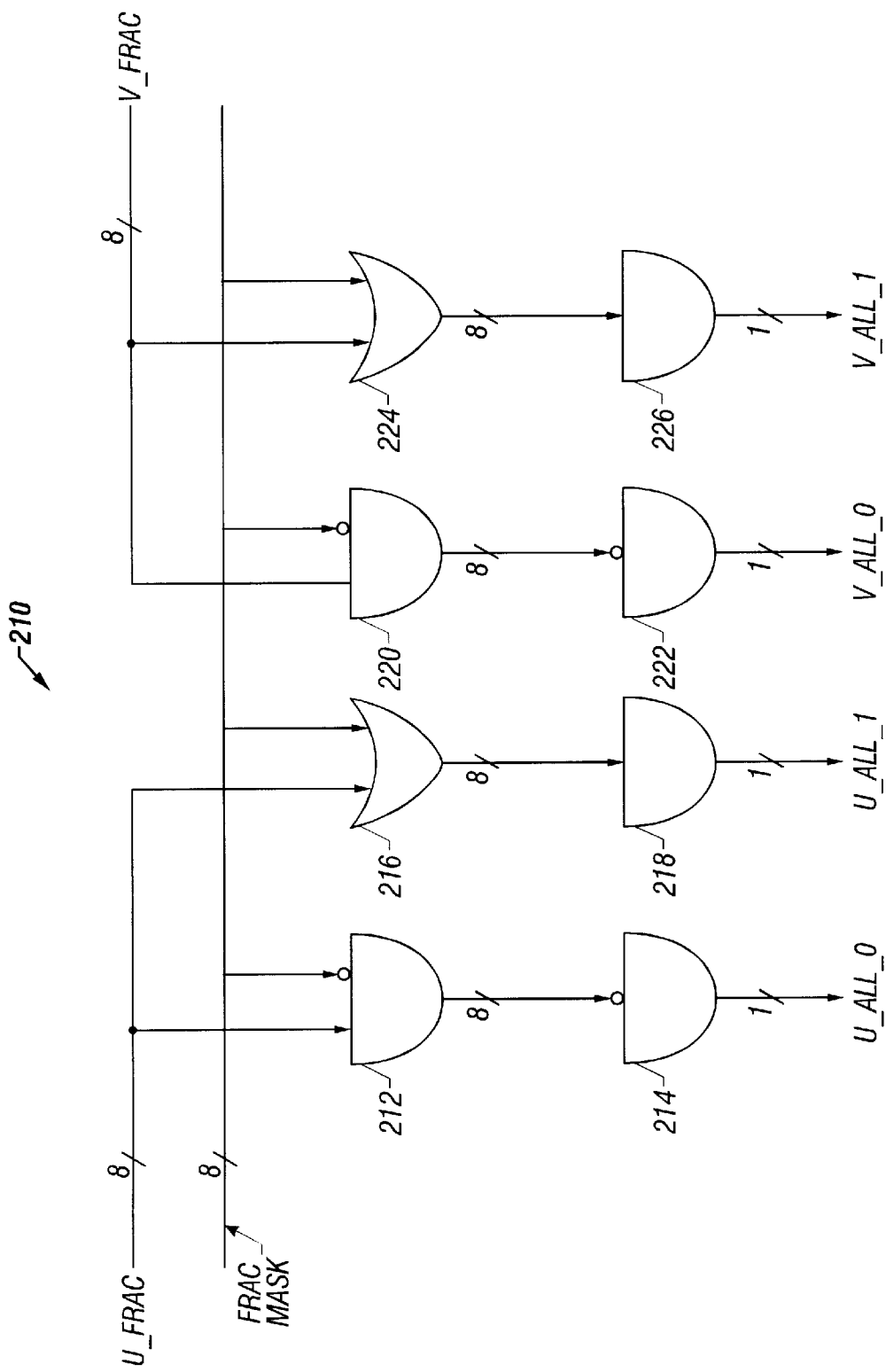
FIG. 7 shows the mask logic of FIG. 4 constructed in accordance with the present invention.

Referring now to FIG. 7, mask logic 210 preferably includes six AND gates 212, 214, 218, 220, 222, and 226 and two OR gates 216 and 224. The AND gates 212, 214, and 218 and OR gate 216 comprise the logic for generating signals u_all_0 and u_all_1. The other half of the mask logic 210 including AND gates 220, 222, and 226 and OR gate 224 has comparable structure and is used to generate the v_all_0 and v_all_1 signals. Because the two halves of mask logic 210 function substantially the same, only the portion pertaining to the generation of u_all_0 and u_all_1 signals will be described. Moreover, as one skilled in the art will understand, by constructing the mask logic 200 of combinatorial logic, no extra time (in the form of clock pulses) is required to generate the mask logic output signals.

The u_all_0 output signal preferably comprises a single bit value that becomes active when the upper order bits of u_frac are all logic 0 values, indicating that the coordinate lies in region I, IV, or VII. The u_all_1 signal is also a single bit that becomes active when the upper order bits of u_frac are all logic 1 values indicating that the coordinate lies in region III, VI, or IX. If neither u_all_0 or u_all_1 are active, then it is to be inferred that the coordinate lies in region II, V, or VIII.

Referring still to FIG. 7, with respect to the generation of the u_all_0 signal, the eight bit u_frac signal is provided as an input signal to AND gate 212 and OR gate 216. The frac mask is also provided as an inverting input to AND gates 212, 220 and OR gates 216, 224. The AND gate 212 combines together the u_frac and frac mask signals in a logical AND operation to provide an eight bit output signal. A bit in the output signal of AND gate 212 is a logic 1 value only when the associated bits in u_frac is a logic 1 and in the frac mask is a logic 0 (e.g., bit 3 in u_frac is a logic 1 and bit 3 in frac mask is a logic 1). The eight bits from AND gate 212 are provided to inverting input terminals of AND gate 214 and logically AND'ed together. Thus, the output bit of AND gate 214, which represents the u_all_0 signal, becomes active (logic 1) only when each of the input bits to AND gate 214 are logic 0 values.

Two examples fully clarify how the u_all_0 signal is generated. The examples assume that the three most significant bits of u_frac are to be considered for purposes of determining the region in which a u, v coordinate lies. These three bits set boundary lines 202 at the ⅛ and ⅞ points as explained previously with respect to FIG. 6B. The frac mask thus is "0001 1111." In the first example, the u coordinate is "0001 0110" signifying that the coordinate falls in regions I, IV, or VII because bits 5–7 are "000." In the second example, the coordinate is "0011 1111" signifying that the coordinate falls in regions II, V, or VIII because bits 5–7 include a mix of 0 and 1 values. The results of the two examples are shown below in Table III.

TABLE III

| | Example 1 | | | | | | | | Example 2 | | | | | | | |
|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 |
| u_frac | 0 | 0 | 0 | 1 | 0 | 1 | 1 | 0 | 0 | 0 | 1 | 1 | 1 | 1 | 1 | 1 |
| frac mask | 0 | 0 | 0 | 1 | 1 | 1 | 1 | 1 | 0 | 0 | 0 | 1 | 1 | 1 | 1 | 1 |
| AND gate 212 output | 0 | 0 | 0 | 0 | 0 | 0 | 0 | 0 | 0 | 0 | 1 | 0 | 0 | 0 | 0 | 0 |
| u_all_0 | | | | | 1 | | | | | | | | 0 | | | |

In the first example, the output signal from AND gate 212 is all 0 values and thus, when all eight output bits of AND gate 212 are inverted and ANDed together by AND gate 214, u_all_0 is a logic 1. In the second example, the most significant three bits of u_frac are not all 0 or all 1 values (bit 5 is a logic 1 and bits 6 and 7 are logic 0) and thus the output of AND gate 212 is a logic 1 value. When inverted, that logic 1 value in bit 5 becomes a logic 0 and forces the AND operation performed by AND gate 214 to provide a logic 0 value for u_all_0. Thus, u_all_0 is a logic 1 when all the u_frac bits corresponding to the 0 values in the frac mask also have 0 values (example 1). However, u_all_0 is a logic 0 when any of the u_frac bits corresponding to the 0 values in the frac mask have a logical 1 value (example 2). Moreover, u_all_0 will be a logic 1 only when the associated u coordinate lies in regions I, IV, or VII.

The OR gate 216 and AND gate 218 generate the u_all_1 signal, which is active (logic 1) only when the u coordinate is in regions III, VI, or IX. Each bit in the output signal of OR gate 216 is a logic 1 value if the corresponding bits in either the u_frac or the frac mask is a logic 1 value. Because the lower order bits of the frac mask (bits 0–4 in the examples above) are logic 1 values, the five lower order bits of the output signal from OR gate 216 will always include logic 1 values. The upper order bits in the frac mask are logic 0 values, however, and thus, the upper order bits in the output signal from OR gate 216 are logic 1 values only if the corresponding upper order bits of u_frac are logic 1 values which indicate that the u coordinate specifies regions III, VI, or IX. Therefore, all eight output bits of OR gate 216 will be logic 1 values only if the u coordinate specifies regions III, VI, or IX. As the output of AND gate 218, u_all_1 is a logic 1 value only if all of the input bits to AND gate 218 are logic 1 values. Examples 3 and 4 in Table IV illustrate these results.

230 infers that the u, v coordinate resides in region I, III, VII, or IX and initiates point sampling. State machine checks these conditions preferably in the order indicated above, the reason for which will become apparent below.

For four-texel averaging, the coordinate is in region v if none of the signals u_all_0, u_all_1, v_all_0, or v_all_1 are active (i.e., all four bits are logic 0 values). Equation (1) below includes the logic for assessing whether a coordinate is in region V:

$$4\_texel\_mode = !u\_all\_0 \text{ AND } !u\_all\_1 \text{ AND } !v\_all\_0 \text{ AND } !v\_all\_1 \quad (1)$$

where 4_texel_mode is a signal that is active (preferably logic 1) when a u, v coordinate is in region V, thus indicating the need for four-texel averaging. The symbol "!" indicates the logical "NOT" operation.

Two-texel averaging is indicated if the u, v coordinate is in region II, IV, VI, or VIII. This determination is made when the 2_texel_mode signal in equation (2) below is a logic 1:

$$2\_texel\_mode = ![(u\_all\_0 \text{ OR } u\_all\_1) \text{ AND } (v\_all\_0 \text{ OR } v\_all\_1)]. \quad (2)$$

Upon examination of logic equation (2), the 2_texel_mode signal will be a logic 1 even if the coordinate resides in region V, normally requiring four-texel averaging. However, equation (1) is used to check for the four-texel averaging mode and based on the priority discussed above, equation (1) is performed before equation (2) and thus, 4_texel_mode will become active and equation (2) will not be performed. Point sampling is indicated for regions I, III, VII, or IX. Point sampling is inferred after equation (1) indicates

TABLE IV

| | Example 3 | | | | | | | Example 4 | | | | | | |
|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 |
| u_frac | 1 | 1 | 1 | 1 | 0 | 1 | 1 | 0 | 1 | 0 | 1 | 1 | 1 | 0 | 1 | 1 |
| frac mask | 0 | 0 | 0 | 1 | 1 | 1 | 1 | 1 | 0 | 0 | 0 | 1 | 1 | 1 | 1 | 1 |
| OR gate 216 output | 1 | 1 | 1 | 1 | 1 | 1 | 1 | 1 | 1 | 0 | 1 | 1 | 1 | 1 | 1 | 1 |
| u_all_1 | | | | 1 | | | | | | | | 0 | | | | |

In example 3, the three most significant bits (bits 5–7) are logic 1 values indicating that the associated u coordinate is in regions III, VI, or IX. As a result, the output of OR gate 216 includes all logic 1 values and thus, u_all_1 is a logic 1. In example 4, the three most significant bits of u_frac are "101" indicating that the u coordinate is not in regions III, VI, or IX. As a result, the output of OR gate 216 includes a 0 value (bit 6) and thus, u_all_1 is a logic 0.

Figure 8:
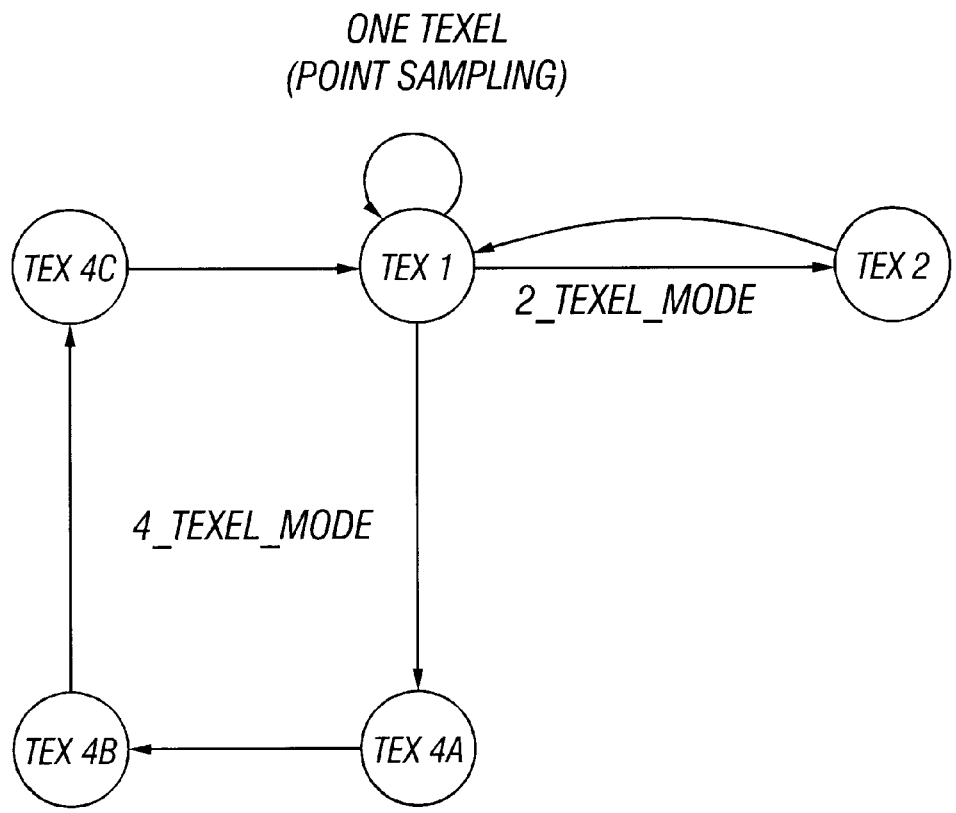
FIG. 8 shows the state machine of FIG. 4 constructed in accordance with the present invention.

Referring now to FIGS. 5 and 8, state machine 230 is shown to include states tex 1, tex 2, tex 4a, tex 4b, and tex 4c. State machine 230 preferably directs the operation of the graphics system 100 to provide point sampling, two-texel averaging, and four-texel averaging. To provide these three texture mapping operations, state machine 230 includes three control paths. The control path followed is dictated by the position of the u, v coordinate within the nine regions. That region is determined by examination of signals u_all_0, u_all_1, v_all_0, and v_all_1, as explained above. To determine the appropriate control path, state machine 230 first determines if four-texel averaging is to be implemented by determining if the u, v coordinate is in region V. If it is not, the state machine checks to see if two-texel averaging is to be implemented by determining whether the coordinate resides in regions II, IV, VI, or VIII. If not, the state machine that the coordinate is not in region v and equation (2) indicates that the coordinate is not in regions II, IV, VI, or VIII.

Referring to FIGS. 4, 5, and 8, state machine 230 begins in state tex 1. If the 4_texel_mode signal is asserted on control passes to state tex 4a in which the first of the four nearest texels to be averaged is retrieved from texture memory 350 and an associated scale factor is computed by math logic 240. Control then passes to state tex 4b in which the second texel is obtained from texture memory and a second scale factor is computed. Control then passes to state tex 4c where the third texel is retrieved and its scale factor is computed. Finally, control passes back to state tex 1 where the fourth texel to be averaged is retrieved and its scale factor is computed. At this point, the scaled average of the four retrieved texels is computed by selectable mode filter 400 and provided as the texel_out value.

If the 4_texel_mode signal was inactive indicating that the coordinate was not in region V, 2_texel_mode is computed and if true (indicating the need for two-texel averaging) control passes from initial state tex 1 to state tex 2. In state tex 2, the first of two texels to be averaged is retrieved from texture memory and an associated scale factor is computed by math logic 240. Control then passes back to state tex 1 and the second texel is retrieved and its associated scale factor is computed. At this point, the scaled average of the two retrieved texels is computed by selectable mode filter 400 and provided as the texel_out value.

If neither 4_texel_mode or 2_texel_mode signals is asserted, then point sampling is performed. State machine 230 loops from state tex 1 back to state tex 1 and retrieves the closest texel to the u, v coordinate. No texel averaging is necessary in point sampling and the texel retrieved is the texel used to render the pixel.

Figure 9:
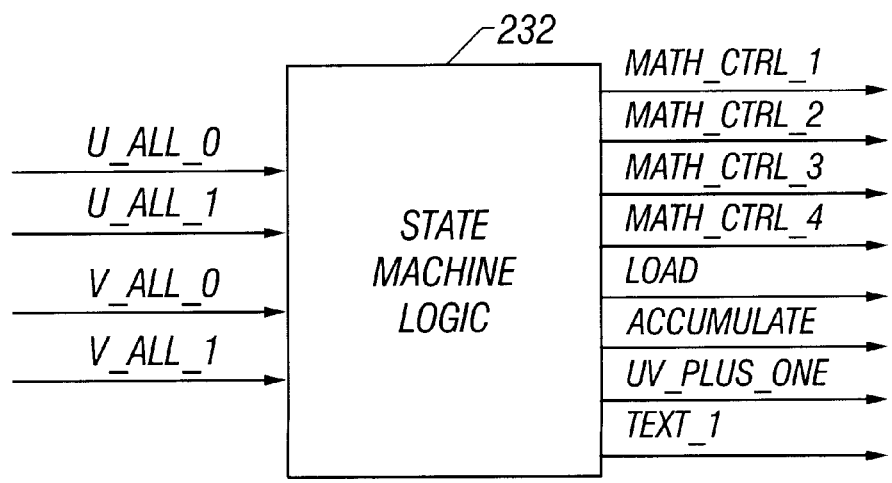
FIG. 9 shows input and output signals to the state machine logic of the state machine of FIG. 4.
Figure 10:
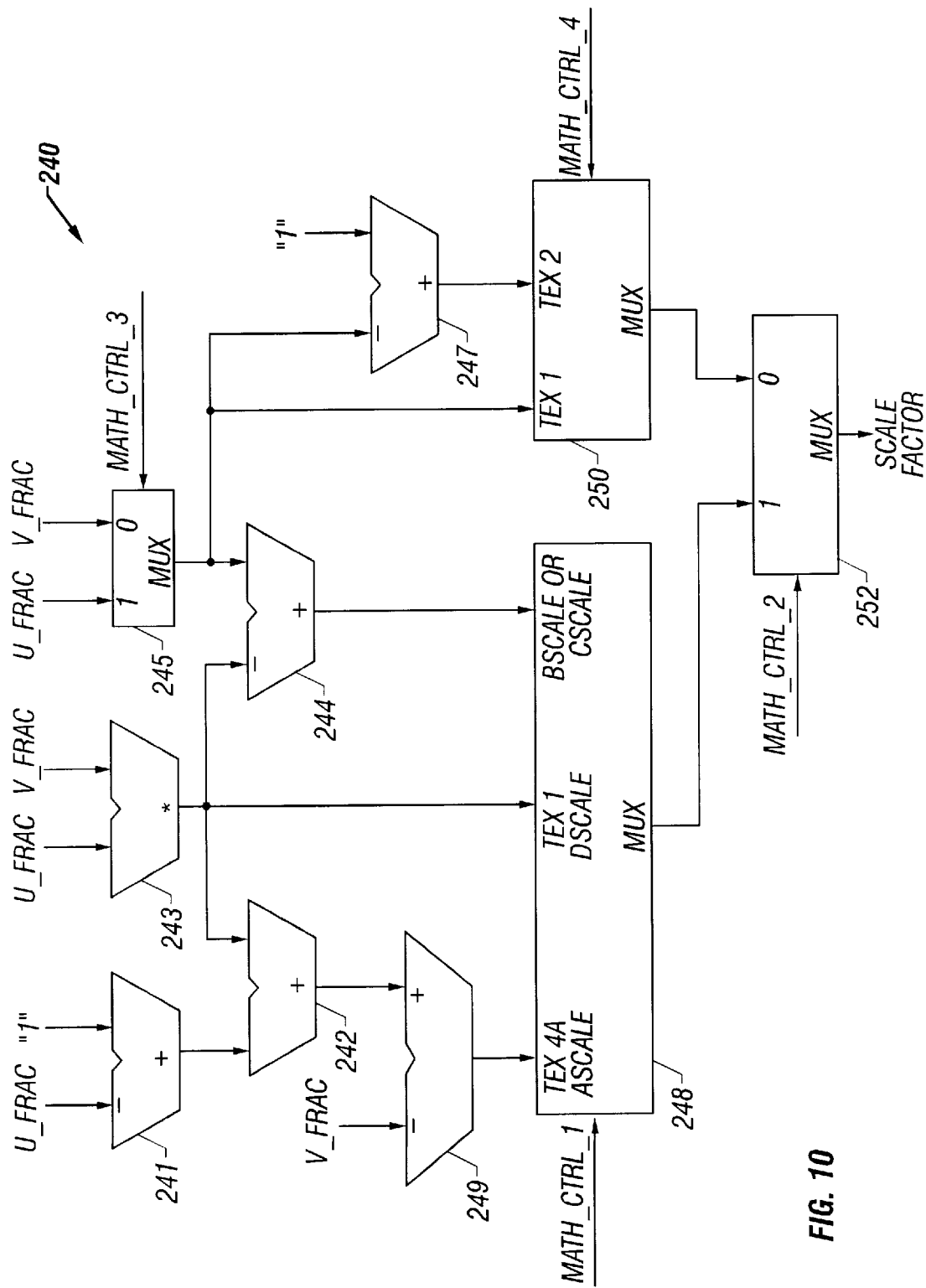
FIG. 10 shows the math logic of FIG. 4 constructed in accordance with the present invention.

Referring now to FIGS. 9 and 10, math logic 240, under control of state machine logic 232, is shown for computing the scale values used during two and four-texel averaging math logic 240 preferably includes adders 241, 242, 249, multipliers 243 and multiplexers 245, 248. 250, 252 The math_ctrl_1, math_ctrl_2, math_ctrl_3, and math_ctrl_4 control signals from state machine logic 232 are used to control the four multiplexers 245, 248, 250, and 252. The load, accumulate, tex_1, and uv_plus_one signals from state machine logic 232 are used with regard to selectable mode filter 400 and u, v address calc 260 (FIG. 4), as will be explained below.

Math logic 240 computes scale values for two and four-texel averaging. The four-texel averaging equation preferably is:

$$4\_texel\_average = A*A_{scale} + B*B_{scale} + C*C_{scale} + D*D_{scale} \quad (3)$$

where 4_texel_average is the averaged or bilinearly filtered value of texels A, B, C, and D scaled by the scale values $A_{scale}$, $B_{scale}$, $C_{scale}$, and $D_{scale}$. The four scale values are functions of u_frac and v_frac as follows:

$$A_{scale} = 1 - u\_frac - v\_frac + u\_frac*v\_frac \quad (4)$$

$$B_{scale} = u\_frac - u\_frac*v\_frac \quad (5)$$

$$C_{scale} = v\_frac - u\_frac*v\_frac \quad (6)$$

$$D_{scale} = u\_frac*v\_frac \quad (7)$$

Two-texel averaging is considerably simpler, although four different pairs of texels A/B, A/C, B/D, C/D are potentially subject to being averaged to produce a texel value for a u, v coordinate in regions II, IV, VI, or VIII. Table V includes all combinations of two-texel averaging possible for the four texels of FIG. 2 along with the averaging and scale factor equations for each texel pair.

output signal from adder 242 to provide the complete $A_{scale}$ value for equation (4).

The $B_{scale}$ and $C_{scale}$ values from equations (5) and (6) include the common multiplier term of −u_frac*v_frac. This common term is provided by multiplier 243. The output of multiplier 243 is then subtracted from the output of multiplexer 245 by adder 244. Multiplexer 245 receives as its input signals u_frac and v_frac. State machine logic 232 (FIG. 9) by way of the math_ctrl_3 signal dictates whether the output signal of multiplexer is u_frac or v_frac. Thus, the state machine logic activates the math_ctrl_3 signal to select either u_frac when $B_{scale}$ is to be calculated (during state tex 4b in FIG. 8) or v_frac when $C_{scale}$ is to be calculated (during state 4c). Finally, the $D_{scale}$ value in equation (7) is simply the product of u_frac and v_frac which is provided by multiplier 243.

Multiplexer 248 is controlled by a control signal math_ctrl_1 from state machine logic 232. Math_ctrl_1 which may comprise multiple bits, selects as an output for the multiplexer 248 one of the three input signals. The output of multiplexer 248 is provided to multiplexer 252. Thus, during the appropriate states of the control loop including tex 4a, tex 4b, tex 4c, and tex 1 (FIG. 8), state machine logic controls multiplexer 248 to provide the $A_{scale}$, $B_{scale}$, $C_{scale}$, and $D_{scale}$ to multiplexer 252.

The combination of multiplexer 245 and adder 247 generates the scale factors necessary for two-texel averaging shown in third and fourth columns of Table V. The scale factors in the third column are all in the form of 1−X, where X is either u_frac or v_frac. At the appropriate time during the state diagram of FIG. 8, multiplexer 245 selects either u_frac or v_frac which is then provided to an inverting input of adder 247. Which fractional coordinate value, u_frac or v_frac, is selected depends on which texels A, B, C, and D are to be averaged as described by the averaging equations in Table V. Adder 247 is also provided with a "1" input signal (or "00000001" in eight bit form) and thus calculates 1−X. The scale factors in the fourth column of Table v are either u_frac or v_frac with not further computation required.

The output of multiplexer 245 and adder 247 are provided to multiplexer 250. Multiplexer 250 is controlled by the control signal math_ctrl_4 from state machine logic 232. Multiplexer 250 preferably provides the term 1−X followed by the value X, where X is either u_frac or v_frac. The output from multiplexer 250 is transmitted to multiplexer 252. Thus, the output signals from multiplexer 250 includes the two-texel averaging scale factors shown in Table V.

TABLE V

| Texels to be Averaged | Averaging Equation | Scale Factor | Scale Factor |
|---|---|---|---|
| A and B | $A*A_{scale} + B*B_{scale}$ | $A_{scale} = 1 - u\_frac$ | $B_{scale} = u\_frac$ |
| A and C | $A*A_{scale} + B*B_{scale}$ | $A_{scale} = 1 - v\_frac$ | $C_{scale} = v\_frac$ |
| B and D | $B*B_{scale} + D*D_{scale}$ | $B_{scale} = 1 - v\_frac$ | $D_{scale} = v\_frac$ |
| C and D | $C*C_{scale} + D*D_{scale}$ | $C_{scale} = 1 - u\_frac$ | $D_{scale} = u\_frac$ |

The logic in FIG. 10 performs the calculations of the scale factors shown above in equations 4–7 and in Table V. Math logic 240 includes adders 241, 242, 249 and multiplier 243 for computing the $A_{scale}$ value shown in equation (4) for four-texel averaging. Adder 241 includes an inverting input for receiving the u_frac input signal and also includes a logic "1" (preferably binary 00000001) as the other input value. Adder 241 thus computes the term 1+(−u_frac), or 1−u_frac. The output of multiplier 243 provides the term u_frac*v_frac and adder 242 produces the term 1−u_frac+u_frac*v_frac. Adder 249 then subtracts v_frac from the Multiplexer 252 is controlled by the control signal math_ctrl_2 signal from by state machine logic 232. The state of the math_ctrl_2 signal determines whether the output signal from either multiplexer 248 or multiplexer 250 is to be provided as the scale factor, thereby either selecting a four-texel scale factor or a two-texel scale factor. Moreover, the output signal from multiplexer 252 is a series of scale factors for either two or four-texel averaging. If two-texel averaging is desired, two scale factors are produced. If four-texel averaging is desired, four scale factors are produced. The timing of the multiplexers in math logic 240 is controlled by the control signals provided by state machine logic 232 generally according to the state machine diagram of FIG. 8.

Figure 11:
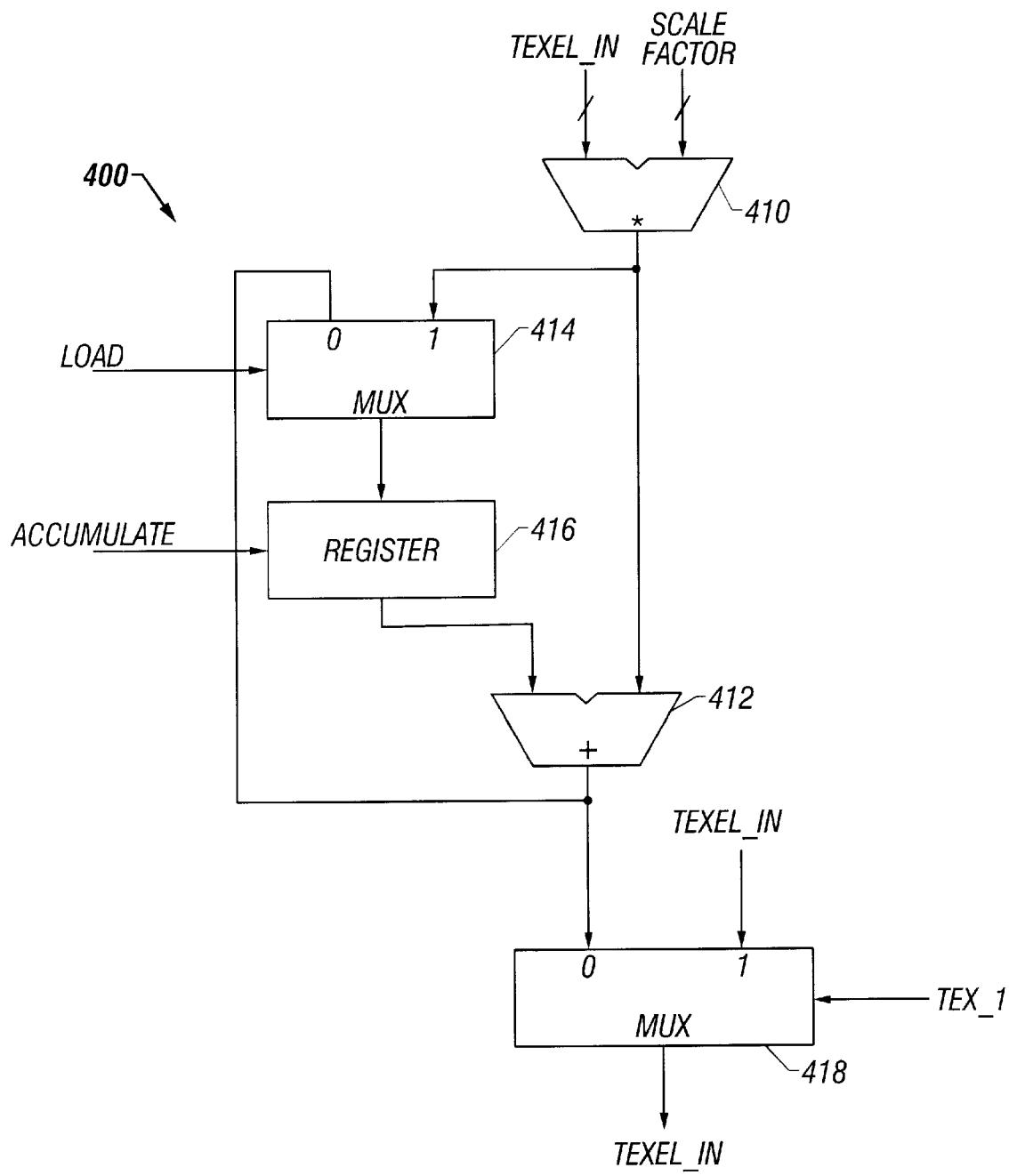
FIG. 11 is a schematic diagram of the selectable mode filter of FIG. 3 constructed in accordance with the present invention.

Referring now to FIGS. 4, 5, and 11, the selectable mode filter 400 preferably includes multiplier 410, adder 412, multiplexers 414, 418 and accumulator register 416. The inputs to the filter 400 include the texel_in and scale factors, as well as the load and accumulate control signals. The texel_in value is retrieved from texture memory 350 (FIG. 3) and represents a texel value either to be averaged (during two or four-texel filtering) or to be used to render the pixel (during point sampling texture mapping). Selectable mode filter 400 generally performs adding and accumulating functions to perform the averaging operations of equation (3) and Table V. At substantially the same time that a texel value is retrieved from texture memory 350, an appropriate scale factor is provided by math logic 240 during either two or four texel-averaging. Multiplier 410 multiplies the texel value by its scale factor. The output of multiplier 410 is provided to multiplexer 414 and selected as the output signal for multiplexer 414 output by the load control signal, which is generated by state machine logic 232 (FIG. 9). The first texel*scale value from multiplier 410 is then loaded into accumulator register 416 when the accumulate signal, provided by state machine logic 232, is asserted. At this point, the first term in the averaging equation, such as $A^*A_{scale}$ from equation (3), is loaded into the accumulator register 416. For each of the next two terms during four-texel averaging (terms 2 and 3), multiplier 410 multiplies the texel_in value by the associated scale factor and the resulting product is added to the current contents of the accumulator register by adder 412. The resulting sum of adder 412 is loaded through multiplexer 414 and stored in accumulator register 416.

When the fourth texel*scale value during four-texel averaging (or the second value during two-texel averaging) is computed by multiplier 410, it is added to the current contents of accumulator register 416 and provided as the output texel_out value from multiplexer 418 under control by the tex_1 signal. Thus tex_1 is asserted by state machine logic 232 to select the output signal from adder 412 during two or four texel averaging.

If, instead, point sampling is required (i.e., no averaging required), the texel_in value, which is also provided directly to multiplexer 418 is selected by state machine logic 232 via the tex_1 control signal. Texel_in during point sampling is simply the closest pixel to the u, v coordinate generated by texture map address generator 150. Because no averaging is needed, the texel_out value is selected by state machine logic 232 to be the texel_out value.

While a preferred embodiment of the invention has been shown and described, modifications thereof can be made by one skilled in the art without departing from the spirit of the invention.

What is claimed is:

1. A texture mapping method for applying a texel value to a pixel on a computer screen comprising the steps of:

(a) converting a screen pixel address to a fractional coordinate in a texture map, said fractional coordinate including an integer portion and a fractional portion and said texture map including integer texel values;

(b) performing a four-texel averaging texture mapping technique if said fractional coordinate is outside a first predetermined range from all integer texel values in said texture map;

(c) performing a two-texel averaging texture mapping technique if said fractional coordinate is within a second predetermined range of two texels in said texture map and outside a third predetermined range from all other texels; and (d) selecting a nearest texel to said fractional coordinate if said fractional coordinate is within a fourth predetermined range of said nearest texel.

2. The method of claim 1 wherein the step of performing a four-texel averaging texture mapping technique (step b) includes the steps of:

(b)(1) calculating a scale factor for each of four texels to be averaged;

(b)(2) multiplying each of said texels to be averaged by its associated scale factor; and (b)(3) accumulating the sum of said products of said texels and the associated scale factors (step (b)(2)), the sum of said products used as the texel value to be applied to a screen pixel.

3. The method of claim 2 wherein the step of performing a two-texel averaging texture mapping technique (step c) includes the steps of:

(c)(1) calculating a scale factor for each of two texels to be averaged;

(c)(2) multiplying each of said texels to be averaged by its associated scale factor; and (c)(3) accumulating the sum of said products of said texels and the associated scale factors (step (c)(2)), the sum of said products used as the texel value to be applied to a screen pixel.

4. The method of claim 1 wherein determining if said fractional coordinate is within said range of a texel is accomplished by applying a frac mask to said fractional coordinate.

5. The method of claim 1 wherein the n most significant bits of said fractional portion of said fractional coordinate determine the size of the predetermined range.

6. The method of claim 5 wherein the step of applying said frac mask to said fractional coordinate includes determining whether the n most significant bits of said fractional portion of said fractional coordinate are all logic 0 values.

7. The method of claim 6 wherein the step of applying said frac mask to said fractional coordinate includes determining whether the n most significant bits of said fractional portion of said fractional coordinate are all logic 1 values.

8. A graphics system for generating texel values for pixels on a monitor with the spatial location of each pixel defined by an x, y address, said system comprising:

an address generator that converts the x, y pixel address to a texel coordinate;

mask logic receiving the texel coordinate together with a mask signal that defines boundaries relative to texel integer values, said mask logic generating an output signal identifying the boundary within which the texel coordinate lies; and a state machine that generates control signals that identify the type of filtering to implement to select the texel value for the texel coordinate, based upon the output signal from said mask logic identifying the boundary within which the texel coordinate lies;

wherein the type of filtering includes two-texel averaging when the texel coordinate lies in a boundary within a first predetermined range of only two texel integer values.

9. A system as in claim 8, wherein the type of filtering includes four-texel averaging when the texel coordinate lies in a boundary outside a second predetermined range of four texel integer values.

10. A system as in claim 9, wherein said state machine uses point sampling to select a texel value for said texel coordinate when the texel coordinate lies in a boundary within a third predetermined range of only one texel integer value.

* * * * *